United States Patent
Engl et al.

(10) Patent No.: US 6,874,845 B2
(45) Date of Patent: Apr. 5, 2005

(54) SHADE TARP AS SUN SHIELD

(75) Inventors: Andreas Engl, Munich (DE); Attila Güven, Weilheim (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/637,516

(22) Filed: Aug. 11, 2003

(65) Prior Publication Data

US 2004/0040676 A1 Mar. 4, 2004

(30) Foreign Application Priority Data

Aug. 29, 2002  (DE) .......................................... 102 40 582
Aug. 29, 2002  (DE) .......................................... 102 40 581

(51) Int. Cl.[7] .................................................. B60J 7/00
(52) U.S. Cl. ...................................... 296/214; 160/404
(58) Field of Search ........................ 296/214, 142–143; 160/395, 398, 387, 404

(56) References Cited

U.S. PATENT DOCUMENTS

| | | | | |
|---|---|---|---|---|
| 278,884 A | * | 6/1883 | Clawson ..................... | 160/395 |
| 292,333 A | * | 1/1884 | Lobdell ...................... | 160/398 |
| 661,494 A | * | 11/1900 | Clark et al. ................. | 160/330 |
| 5,002,111 A | * | 3/1991 | Boiteau ....................... | 160/67 |
| 5,067,546 A | * | 11/1991 | Jeuffray et al. ............. | 160/23.1 |
| 5,291,934 A | | 3/1994 | Ouvrard et al. | |
| 5,511,844 A | * | 4/1996 | Boardman ............. | 296/107.11 |
| 6,186,587 B1 | * | 2/2001 | Entenmann ................. | 296/214 |
| 6,536,829 B2 | | 3/2003 | Schlecht et al. | |

2003/0006630 A1   1/2003  Kralik et al.

FOREIGN PATENT DOCUMENTS

| | | | |
|---|---|---|---|
| DE | 7217191 | 9/1972 | |
| DE | 690 00 685 T2 | 4/1990 | |
| DE | 42 18 383 C1 | 9/1993 | |
| DE | 42 10 972 A1 | 10/1993 | |
| DE | 197 16 196 C1 | 10/1998 | |
| DE | 198 60 826 A1 | 7/2000 | |
| DE | 101 22 570 C1 | 5/2001 | |
| DE | 100 40 624 A1 | 3/2002 | |
| EP | 1 063 385 A2 | 12/2000 | |
| JP | 359202935 | * 11/1984 | ................. 296/214 |
| JP | 258213 | * 10/1988 | ................. 296/214 |

OTHER PUBLICATIONS

US 6,672,656, 1/2004, Kralik et al. (withdrawn)*

* cited by examiner

Primary Examiner—Dennis H. Pedder
(74) Attorney, Agent, or Firm—Nixon Peabody LLP; David S. Safran

(57) ABSTRACT

A sun shield which can be moved between an operating position under a translucent or transparent roof area of a motor vehicle roof (4) and a rest area next to this roof area, with a shade tarp (10) which is located underneath the roof (4) and which can be wound onto a take-up roller (12). A free end (22) of the shade tarp (10) is fixed in a transverse bow (18, 118) with pre-tensioning in the transverse direction in the transverse bow (18). Fixing of the free end (22) of the shade tarp (10) in the transverse bow (18, 118) is preferably via insertion of a turn-down portion of the free end of the tarp (10) into a groove of the transverse bow (18, 118) where it is held by pins or clamping elements formed by plastic deformation of areas of the transverse bow (18, 118).

5 Claims, 3 Drawing Sheets

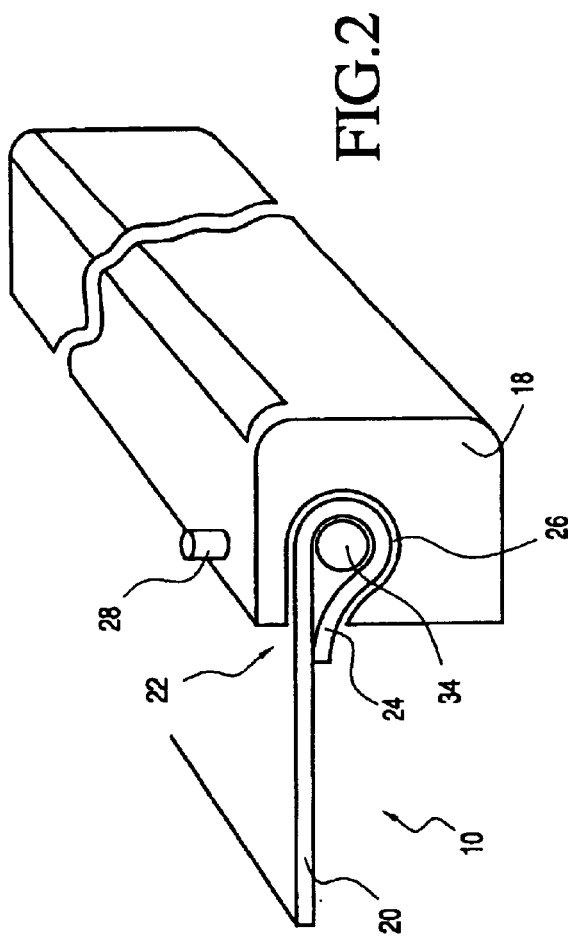
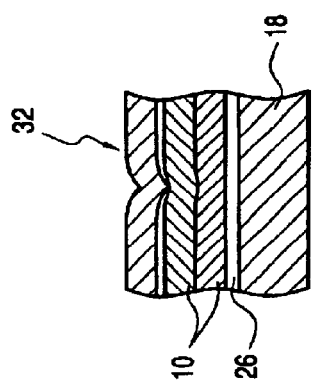
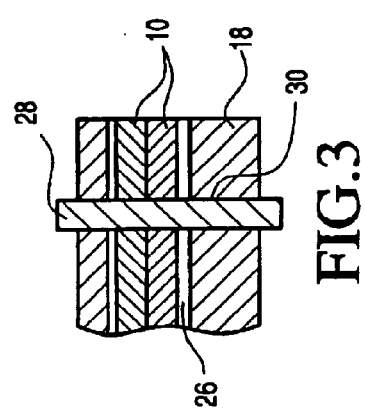

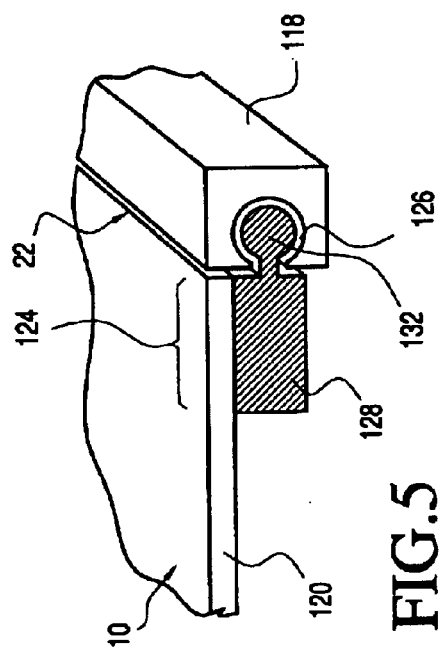
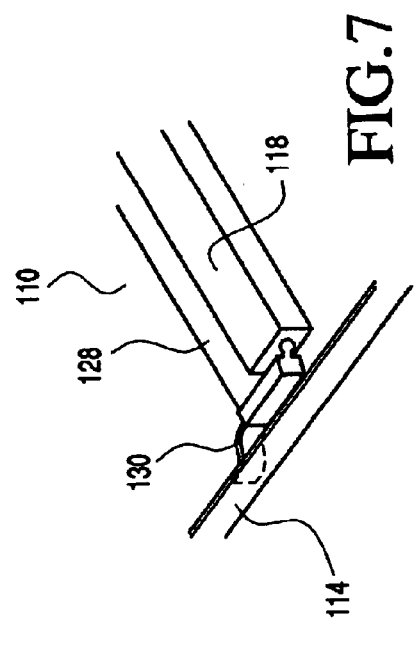
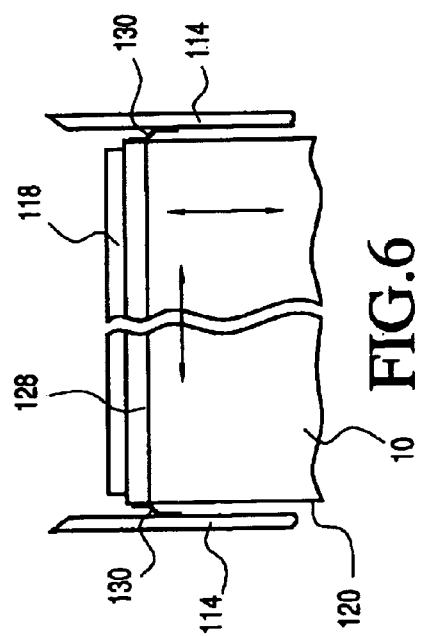

SHADE TARP AS SUN SHIELD

BACKGROUND OF THE INVENTION

1. Field of the Invention

The invention relates to a sun shield which can be moved between an operating position under a translucent roof area and a rest position next to this roof area, especially for an at least partially transparent motor vehicle roof with a shade tarp which is located underneath the roof and which is wound onto a take-up roller.

2. Description of Related Art

Shades of the initially mentioned type are used as antiglare devices or to cover glass surfaces in a motor vehicle in various configurations. Thus, for example, published German Patent Application DE 42 10 972 A1 describes a shade as an anti-glare device with a pivotally mounted take-up roller for a roll-up hanging with a fall rod located on its pull out-side end, and with a drive device for the take-up roller. The hanging is guided when at least one telescoping rod is extended and engages the fall rod of the hanging. Such a shade is especially suited for the rear window of a motor vehicle, but less for a glass roof under which it must be pulled out roughly horizontally. For pulling-out horizontally, an additional support or guide for preventing excessive deflection is necessary.

Published German Patent Application DE 198 60 826 A1 describes a sun shield for a translucent roof area, especially a glass motor vehicle roof. The sun shield comprises a shade with a take-up roller, which, on its free edge, bears a clamping strip which runs in a self-locking manner in lateral slide guides, and which strip is engaged by tension belts which are guided via a deflection roller and which are connected to the take-up roller to transfer torque. The shade and the tension belts are kept tensioned by a spring arrangement. In order to keep the shade tensioned at any time and to prevent the formation of folds, in this known arrangement, the construction cost is relatively great.

A sun-shielding shade without guide rails for a motor vehicle is known from published German Patent Application DE 100 40 624 A1. The shade tarp is either itself relatively stiff or is carried on its front edge using guided guide rods or slide rods to prevent sagging. Its front or back edge is held in contact with the pertinent window.

Finally, German Patent DE 101 22 570 C1 and its counterpart published U.S. patent application US 2003/000630 discloses a sun-shielding shade for a motor vehicle roof which has a shade tarp which can be wound onto a take-up roller and which is located underneath the roof, with opposing side edges which are movably guided in the direction of shade movement on guide rails and are held in the transverse direction with pre-tensioning of the shade tarp.

In general, when the known shade arrangements are installed the installation tolerances are often low and can lead to undesirable formation of folds in the extended sun-shielding shade. This can be the case especially when the take-up roller and the transverse bow of the extended sun-shielding shade are not flush with one another.

SUMMARY OF THE INVENTION

A primary object of the present invention is to improve a shade arrangement which is simple to operate and which has a simple structure for a motor vehicle, such that the formation of folds in the extended shade can be largely prevented.

A further object of the present invention is to improve a shade arrangement which has a side rail guide constructed to substantially prevent the formation of folds in the extended shade The first object is achieved with a movable sun shield by fixing the shade tarp with pre-tensioning in the transverse direction in a transverse bow. When the connection is established between the turned-down shade tarp and the transverse bow, the shade tarp is connected first to the transverse bow, then pre-tensioned in the transverse direction and preferably fixed on the two opposing ends of the elongated transverse bow. This can take place, preferably, by means of at least two fixing element for fixing of the free end of the shade tarp without folds in the transverse bow. The fixing elements can be made, in a first version of the invention, as cross pins which lead through the corresponding recesses in the transverse bow and in the shade tarp and are fixed securely there. One alternative embodiment, can provide that the shade tarp is clamped or braced in the transverse bow and in this way is permanently connected to the transverse bow.

Alternatively, in accordance with the second object, it can also be provided that the opposing side edges of the shade tarp in a direction of its motion are guided laterally on guide rails and are held with pre-tensioning of the shade tarp in the transverse direction. These guide rails are suitable for guiding the shade tarp free of folds and without sagging even over a greater extension path. The shade tarp or shade tarp is movably fixed in the transverse direction in a transverse bow. Preferably, a free end of the shade tarp can be moved in the direction of the lengthwise extension of the transverse bow. This floating support of the shade tarp can equalize position differences during installation and the resulting formation of folds in the extended shade tarp can be prevented.

An embodiment of the invention calls for the free end of the shade tarp to be held in a groove of the transverse bow. Feasibly, the free end of the shade tarp with an additional stiffening holder element is pushed laterally into the groove. The stiffening holding element can be cemented and/or riveted to the shade tarp with its free end and in this way forms a stable counterpiece of the same width as the transverse bow, which counterpiece can be pushed a short distance relative to it. The floating support of the stiffening holding element in the transverse bow can equalize installation tolerances and prevent the formation of folds in the extended shade tarp.

Another embodiment of the invention calls for the opposing side edges of the shade tarp in a direction of its motion to be guided laterally on guide rails and to be held with pre-tensioning of the shade tarp in the transverse direction. These guide rails are suitable for guiding the shade tarp free of folds and without sagging over a greater extension path. According to one preferred embodiment, the holding element is centered by means of spring elements roughly in the middle between the guide rails. These spring elements can be made, for example, as leaf springs which face obliquely toward the guide rail, which are held on the holding part, and which provide for extensive centering of the holding part so that the formation of folds is prevented at the same time.

The invention is explained in detail below using preferred embodiments with reference to the accompanying drawings.

BRIEF DESCRIPTION OF THE DRAWINGS

FIG. 2 shows a perspective of the clamping area of the shade tarp in a transverse bow, FIG. 3 shows a first embodiment of fixing the shade tarp in the transverse bow in a schematic cross section, FIG. 4 shows an alternative embodiment of fixing the shade tarp in the transverse bow in a schematic cross section, FIG. 5 shows a perspective of the clamping area of the shade tarp in a transverse bow in accordance with an alternative embodiment, FIG. 6 shows a schematic plan view of the holding element of the shade tarp in the transverse bow and in the side guide strips, and FIG. 7 is a schematic perspective view of the guide of the holding element shown in FIG. 6.

DETAILED DESCRIPTION OF THE INVENTION

Figure 1:
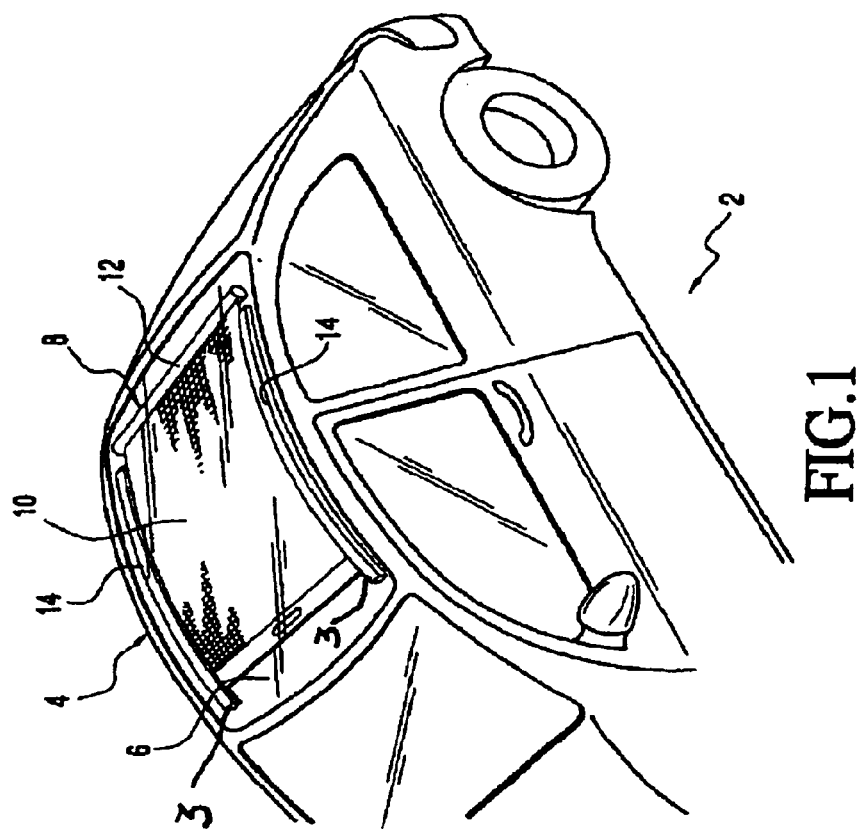
FIG. 1 schematically shows in a top view a motor vehicle roof with a fixed glass cover and an underlying sunshade.

FIG. 1 Shows a motor vehicle 2 which has a motor vehicle roof 4 with a transparent roof section which, in this embodiment, is a fixed glass cover 6. The transparent roof section can also be a movable cover for closing or at least partially clearing the roof opening of a motor vehicle which is to be opened, for example, a sliding roof, sliding and lifting roof, spoiler roof or the like. Underneath the vehicle roof 4 or the glass cover 6, there is a sunshade 8 which has a shade tarp 10 and a take-up shaft 12 for winding and unwinding the shade tarp 10. The take-up shaft 12 contains a hollow cylindrical winding body 16 which is located on each end on a bearing part which is pivotally mounted on the vehicle roof via an axially projecting bearing journal. On a free end of the shade tarp 10, it is connected to a transverse bow 18 (compare FIG. 2) which in the closed position of the sunshade 8 can be fixed or hung in the end position underneath the roof. In addition, the shade tarp can be guided in lateral guide rails 14 which provide for transverse tensioning of the extended sunshade 8. In the end position, i.e. in the extended operating position of the shade tarp 10, the transverse bow 18 to which the free end of the shade tarp 10 is attached can be positioned against an end stop 3 at the end of each of the lateral guide rails 14 which is located at the opposite side of the roof area from the take-up roller 12.

FIG. 2 shows the connection of the shade tarp 10 to the transverse bow 18. The free end 22 of the shade tarp 10 is turned down and pushed into the lengthwise groove 26 of the transverse bow 18 with the turned-down section 24, into which preferably a wire 34 or the like can be inserted, and can freely move laterally at first, but cannot be pulled out of the transverse bow 18 in the direction of motion of the shade tarp 12. To fix the shade tarp 10 in the transverse bow 18, it is first tautly tensioned and then fixed in the bow 18 at the two opposing ends of the transverse bow 18. This can take place, for example, by pins 28 (compare FIG. 3) or by clamping (compare FIG. 4) or bracing.

The pins 28 can be pushed into receivers 30 of the transverse bow 18 and of the shade tarp 10 and/or its wire core 34, which receivers are provided accordingly for this purpose. The pins 28 can selectively project, as is shown in FIG. 3. However, preferably, the pins 28 end flush in the transverse bow 18 and do not project out of it. The pins 28 can be connected to the transverse bow 18 in an interference fit or can be screwed there. In FIG. 3, the pins 28 are pushed only through the shade tarp 10, but not through the wire 34 around which the free end 22 is looped.

Clamping as is shown in FIG. 4 can be advantageously done with application of a high spot load which causes plastic deformation of the metallic transverse bow 18 forming clamping projections 32 which engage and fix the shade tarp 10. As the material for the transverse bow especially aluminum is well suited; it has a low weight and can be plastically deformed in the desired manner relatively easily. In this way, the shade tarp 10 is fixed securely in the transverse bow 18 and is under tension at all times.

The material for the shade tarp is feasibly not subject to plastic deformation, therefore does not suffer any loss of pre-tensioning. For the desired application, for example, a plastic fabric with a multilayer structure is particularly well suited from a visual and optical standpoint. A polyurethane paste which has been processed accordingly or a knit is also suitable for the desired application. A suitable material for a shade tarp 10 can also be a textile braided material, as is described in published German Patent Application DE 100 61 827 A1.

In one alternative embodiment of the invention the shade tarp can be laterally guided in addition in guide rails 14 (compare FIG. 1); this can provide for permanent tensioning of the shade tarp 10 and can prevent the formation of folds. In the front area in the vicinity of the transverse bow 18 the formation of folds can be reliably prevented by fixing the shade tarp 10 in the transverse bow 18 as claimed in the invention.

FIG. 5 shows an alternative connection of the shade tarp 10 to the transverse bow. To do this, the free end 122 of the shade tarp 10 is connected to a holding element 128 which is movably guided and held in the transverse bow 118 in the direction of its lengthwise extension. For this purpose, the transverse bow 118 has a groove 126 which opens toward the shade tarp 10 and into which the front guide section 132 of the holding element 128 can be pushed. The groove 126 has a relatively narrow opening and a contour which widens in cross section, for example, in the form of a circular segment. The guide section 132 of the holding element 128 has a corresponding contour with a slender connecting area and a widening guide area.

The holding element 128 has the contour of a flat rod and is preferably made relatively stiff so that it itself cannot sag or kink. The connection between the shade tarp 10 and the holding element 128, along a connecting section 124, can advantageously take place by means of bonding, cementing and/or by means of additional rivets. The holding element 128 is, for example, a plastic part or a suitable metal part, for example, a lightweight metal, such as aluminum. Here, a coated wood or composite component can also be used.

The shade tarp 10 can be laterally guided, in addition, in guide rails 14 (see, FIGS. 1, 6 & 7); this can provide for permanent tensioning of the shade tarp 10 and can prevent the formation of folds. In the front area, in the vicinity of the transverse bow 118 the formation of folds can be reliably prevented by a corresponding connection of the shade tarp 10 to the holding element 128, as noted above relative to FIGS. 2–4.

FIG. 6 illustrates an arrangement in which spring elements 130 are mounted laterally on the holding element 128 and provide for centering of the shade tarp 10 which is supported in the transverse bow 118 in a floating manner between the guide rails 14. The spring elements 130 are made as short leaf springs with a free end, their fixed end is connected to the holding element 128 and their free end, which preferably has an arcuate curvature, can slide along the guide rails 14.

FIG. 7 shows the embodiment of the spring elements 130 in a perspective representation. The spring elements 130, in an advantageous embodiment, can be connected to the holding element 128 such that they are produced, for example, in a common injection mold. In this case, the spring elements 130 are made of plastic as part of holding element 128. Also, spring elements 130 made of metal can be used, in which case which the spring elements can screwed or riveted onto, or embedded into, the holding element 128. The springs should not be too stiff so that, on the one hand, centering of the holding element 28 between the guide rails 14 is ensured, but on the other hand, a low tolerance equalization is enabled to prevent fold formation of the shade tarp 10 in the extended state.

What is claimed is:

1. Sun shield for a motor vehicle roof which is movable between an extended operating position for covering a translucent or transparent roof area and a retracted position next to this roof area, comprising, a take-up roller, a shade tarp which can be wound onto the take-up roller in said retracted position, a transverse bow to which a free end of the shade tarp is attached, the bow, in the extended operating position of the shade tarp being positionable against an end stop at an opposite side of the roof area from said take-up roller, and a stiffening holding element onto which at least one anchoring element is formed on an end thereof and which is held in an anchoring groove extending along the length of the bow, wherein opposite side edges of the shade tarp are laterally guided in the direction of motion of the shade tarp on guide rails, wherein the stiffening holding element is centered between the guide rails by means of spring elements, and wherein, the shade tarp is fixed to the stiffening holding element pro-tensioned in a transverse direction.

2. Sun shield as claimed in claim 1, wherein the spring elements are leaf springs which are fixed on the ends of the stiffening holding element.

3. Motor vehicle roof having a translucent or transparent roof area and a sun shield which is movable between an extended operating position for covering the translucent or transparent roof area and a retracted position next to this roof area, said sun shield comprising, a take-up roller, a shade tarp which can be wound onto the take-up roller in said retracted position, and a transverse bow to which a free end of the shade tarp is attached, the bow, in the extended operating position of the shade tarp being positionable against an end stop at an opposite side of the roof area from said take-up roller, wherein the shade tarp is fixed to the transverse bow, pre-tensioned in a transverse direction, by a stiffening holding element that is located in an anchoring groove extending lengthwise along the transverse bow;

wherein the opposing side edges of the shade tarp are laterally guided in the direction of motion of the shade tarp on guide rails; and wherein the stiffening holding element is centered between the guide rails by means of spring elements.

4. Process for mounting the free end of a shade tarp to a transverse bow of a sun shield of a motor vehicle which is movable between an extended operating position for covering a translucent or transparent roof area and a retracted position next to this roof area, comprising the steps of:

fixing a free end of the shade tarp to a stiffening holding element, mounting the stiffening holding within a groove extending along the length of the the transverse bow, wherein the opposing side edges of the shade tarp are laterally guided in the direction of motion of the shade tarp on guide rails; and centering the stiffening holding element between the guide rails by means of spring elements.

5. Process as claimed in claim 4, wherein the shade tarp is pulled tight in the transverse direction before being fixed in the transverse bow.

* * * * *